(12) United States Patent
Onuki

(10) Patent No.: US 10,750,100 B2
(45) Date of Patent: Aug. 18, 2020

(54) IMAGE PROCESSING APPARATUS THAT GENERATES MOVING IMAGE USING SHOOTING IMAGE, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Kenji Onuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 16/205,402

(22) Filed: Nov. 30, 2018

(65) Prior Publication Data
US 2019/0174073 A1  Jun. 6, 2019

(30) Foreign Application Priority Data

Dec. 5, 2017  (JP) .................................. 2017-233592

(51) Int. Cl.
*H04N 5/262* (2006.01)
*H04N 9/64* (2006.01)
*H04N 5/235* (2006.01)

(52) U.S. Cl.
CPC ......... *H04N 5/2621* (2013.01); *H04N 5/2351* (2013.01); *H04N 9/646* (2013.01)

(58) Field of Classification Search
CPC ..... H04N 5/2621; H04N 5/2351; H04N 9/646
See application file for complete search history.

(56) References Cited

U.S. PATENT DOCUMENTS

| 4,627,004 A | * | 12/1986 | Cool | ....................... B41B 19/01 347/232 |
| 5,606,630 A | * | 2/1997 | Maeda | .................... H04N 5/253 348/E5.049 |
| 8,045,015 B2 | | 10/2011 | Ogawa | |
| 9,438,821 B1 | * | 9/2016 | Parker | .................. G06K 9/4661 |
| 9,456,126 B2 | | 9/2016 | Matsuoka | |
| 2003/0099407 A1 | * | 5/2003 | Matsushima | ........ H04N 5/2351 382/274 |

(Continued)

FOREIGN PATENT DOCUMENTS

| JP | 2008288706 A | 11/2008 |
| JP | 2009044444 A | 2/2009 |
| JP | 2016009062 A | 1/2016 |

*Primary Examiner* — Antoinette T Spinks
(74) *Attorney, Agent, or Firm* — Rossi, Kimms & McDowell LLP

(57) ABSTRACT

An image processing apparatus which is capable of obtaining a moving image having a special effect suitable for a scene while suppressing a load of a user. In the image processing apparatus, an acquisition unit acquires a first image generated by shooting, a division unit divides the first image into two or more regions according to a distribution of a distance of each subject, at the time of shooting, included in the first image, a detection unit detects one of the divided regions as a high brightness region where high brightness pixels exist, a first generation unit performs correction of the first image with different correction intensities with respect to the high brightness pixels and surrounding pixels thereof in the high brightness region to generate a plurality of second images, and a second generation unit generates a moving image using the generated second images.

14 Claims, 7 Drawing Sheets

(56) References Cited

U.S. PATENT DOCUMENTS

| | | | | |
|---|---|---|---|---|
| 2003/0198404 A1* | 10/2003 | Frisken | ................... | G06K 9/36 |
| | | | | 382/285 |
| 2010/0202712 A1* | 8/2010 | Tsuruta | ................... | G06T 5/50 |
| | | | | 382/264 |
| 2011/0249135 A1* | 10/2011 | Minato | .............. | H04N 21/4318 |
| | | | | 348/222.1 |

* cited by examiner

PERSON

TREES +
FOREGROUND BACKGROUND

INFINITY

IMAGE PROCESSING APPARATUS THAT GENERATES MOVING IMAGE USING SHOOTING IMAGE, IMAGE PICKUP APPARATUS, IMAGE PROCESSING METHOD, AND STORAGE MEDIUM

BACKGROUND OF THE INVENTION

Field of the Invention

The present invention relates to an image processing apparatus, an image pickup apparatus, an image processing method, and a storage medium, and particularly, to an image processing apparatus that generates a moving image using a shooting image, an image pickup apparatus, an image processing method, and a storage medium.

Description of the Related Art

As a method for representing an image, there is demanded a technology for generating a moving image having a special effect making use of an atmosphere of a scene.

For example, a moving image called a cinemagraph in which only a partial region in an image changes is known as the moving image. When the cinemagraph is generated, it is necessary to edit a shooting image, to specify a change region and a non-change region, so that a load of a user is large.

In addition, there is known, as the above technology, a technology for automatically adding an animation effect in which light shines to an image. However, when the above technology is used, the moving image may become a moving image in which a shining manner of the light on the image is unnatural.

Therefore, it is necessary to provide a technology for generating a moving image having a special effect by changing only the partial region of the image while suppressing the load of the user.

Meanwhile, there is known a technology for giving a special impression by giving a different effect to each region for an image or emphasizing an atmosphere of the image. For example, Japanese Laid-Open Patent Publication (kokai) No. 2008-288706 discloses a technology for applying gradation correction processing to each region according to distance information, so that a contrast is decreased in a region far from an image pickup apparatus and the contrast is increased in a region close to the image pickup apparatus. As a result, it is possible to give a sense of depth to the image.

However, according to the technology disclosed in Japanese Laid-Open Patent Publication (kokai) No. 2008-288706, in a moving image in which only a partial subject changes like the cinemagraph, if the subject is located far from the image pickup apparatus, it is not possible to emphasize the image by increasing the contrast.

SUMMARY OF THE INVENTION

The present invention provides an image processing apparatus, an image pickup apparatus, an image processing method, and a storage medium, which are capable of obtaining a moving image having a special effect suitable for a scene while suppressing a load of a user.

Accordingly, the present invention provides an image processing apparatus, comprising: an acquisition unit configured to acquire a first image generated by shooting; a division unit configured to divide the first image into two or more regions according to a distribution of a distance of each subject, at the time of shooting, included in the first image; a detection unit configured to detect one of the divided regions as a high brightness region where high brightness pixels exist; a first generation unit configured to perform correction of the first image with different correction intensities with respect to the high brightness pixels and surrounding pixels thereof in the high brightness region to generate a plurality of second images; and a second generation unit configured to generate a moving image using the generated second images.

According to the present invention, it is possible to obtain a moving image having a special effect suitable for a scene while suppressing a load of a user.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

In the present embodiment, a description will now be made of a technology for shooting one still image and generating a moving image using the obtained image without user intervention. It should be noted that, in the present embodiment, the description is given assuming that shooting in a night scene to be one of scenes which are expected to have a highest effect is applied; however, the present invention is also applicable to scenes other than the night scene. In the following description, an image pickup apparatus will be described as an example of an image processing apparatus according to the present embodiment; however, the present invention is not limited thereto and may be applied to a personal computer (PC) or the like, for example. In this case, the PC further includes a communication unit to acquire an image shot by an external image pickup apparatus.

Figure 1:
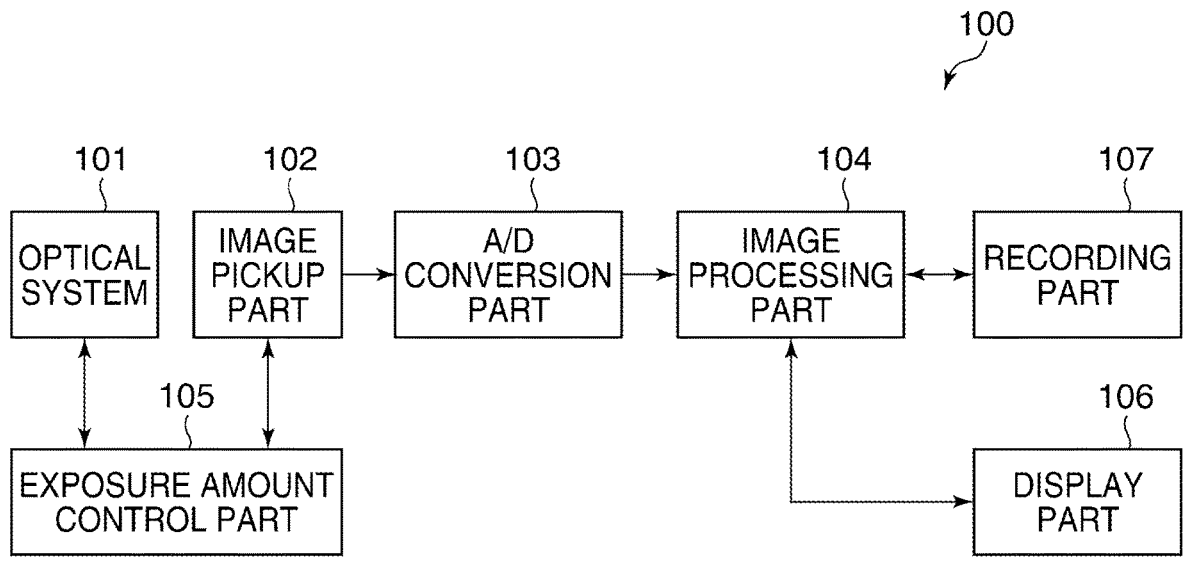
FIG. 1 is a block diagram showing a hardware configuration of an image pickup apparatus according to an embodiment of the present invention.

FIG. 1 is a block diagram showing a hardware configuration of an image pickup apparatus 100 according to an embodiment of the present invention.

In FIG. 1, an optical system 101 includes a lens group including a zoom lens and a focus lens, a diaphragm adjustment device, and a shutter device. The optical system 101 adjusts a magnification, a focus position, or a light amount of a subject image that arrives at an image pickup part 102. The image pickup part 102 is a photoelectric conversion device such as a CCD or a CMOS sensor that photoelectrically converts a light beam of a subject having passed through the optical system 101 and converts the light beam into an electric signal (video signal).

An A/D conversion part 103 converts the video signal input from the image pickup part 102 into a digital image.

In addition to normal signal processing, an image processing part 104 performs gradation processing in the present invention. The image processing part 104 can perform the same image processing on not only an image output from the A/D conversion part 103 but also an image read from a recording part 107.

An exposure amount control part 105 calculates an exposure amount at the time of shooting for obtaining an input image having an appropriate brightness, controls the optical system 101 and the image pickup part 102 to realize this, and controls a diaphragm, a shutter speed, and an analog gain of a sensor.

A display part 106 functions as an electronic viewfinder (EVF) by sequentially displaying an image output from the image processing part 104 on a display member such as an LCD.

The recording part 107 has a function of recording an image and may include an information recording medium using a memory card on which a semiconductor memory is mounted or a package accommodating a rotating recording body such as a magneto-optical disk, for example.

Figure 3A:
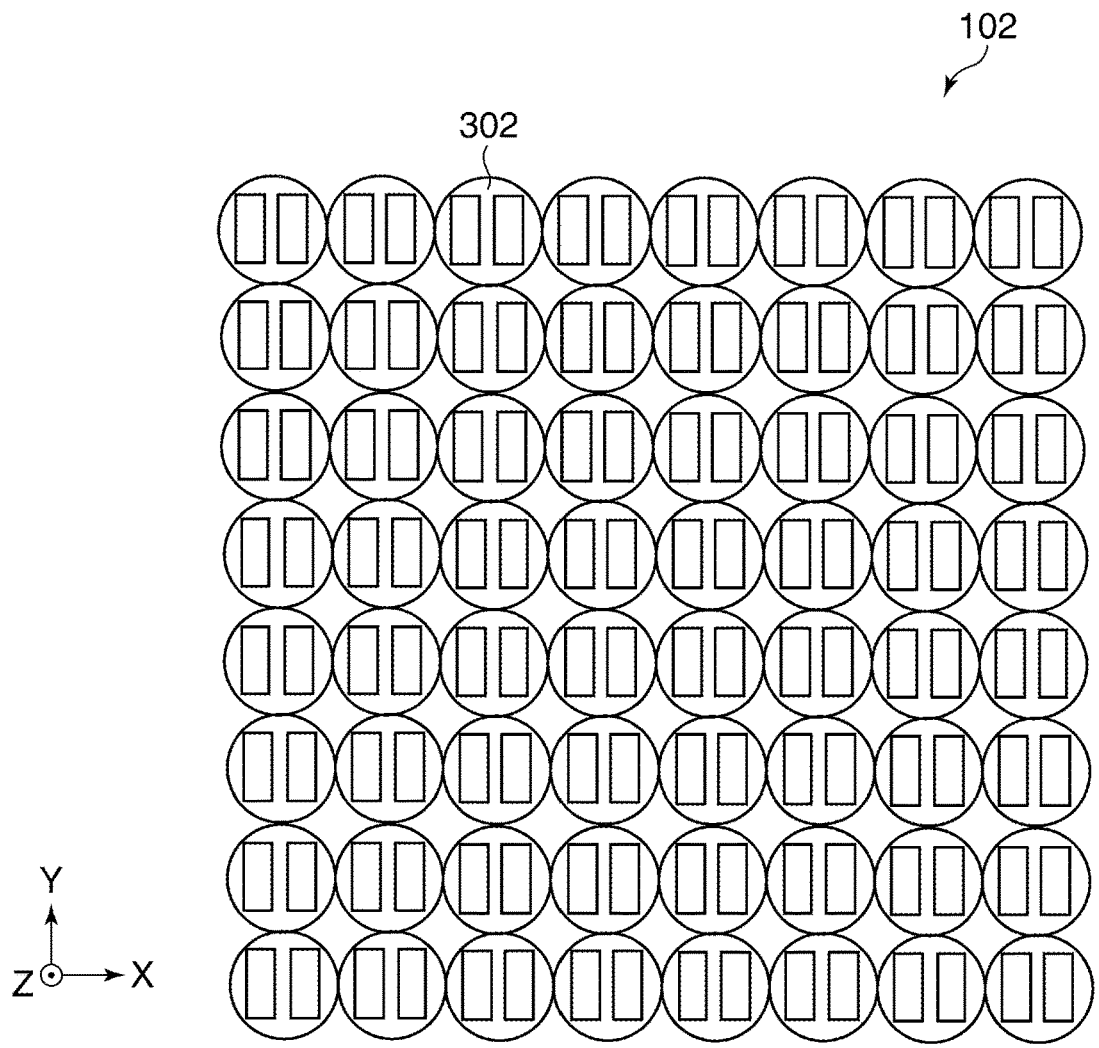
FIGS. 3A and 3B are views showing a configuration of an image pickup part in FIG. 1.
Figure 3B:
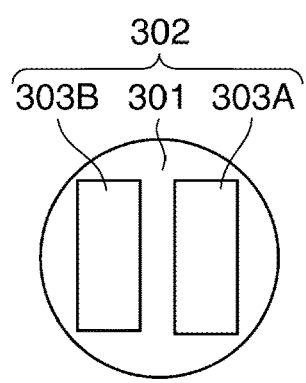

FIG. 3A shows an arrangement configuration of pixels 302 constituting the image pickup part 102 of FIG. 1. FIG. 3B is an enlarged view of the pixel 302 which includes a microlens 301 and a pair of photoelectric conversion parts 303A and 303B. As shown in FIG. 3A, in the image pickup part 102, the pixels 302 are regularly arranged two-dimensionally.

Figure 2:
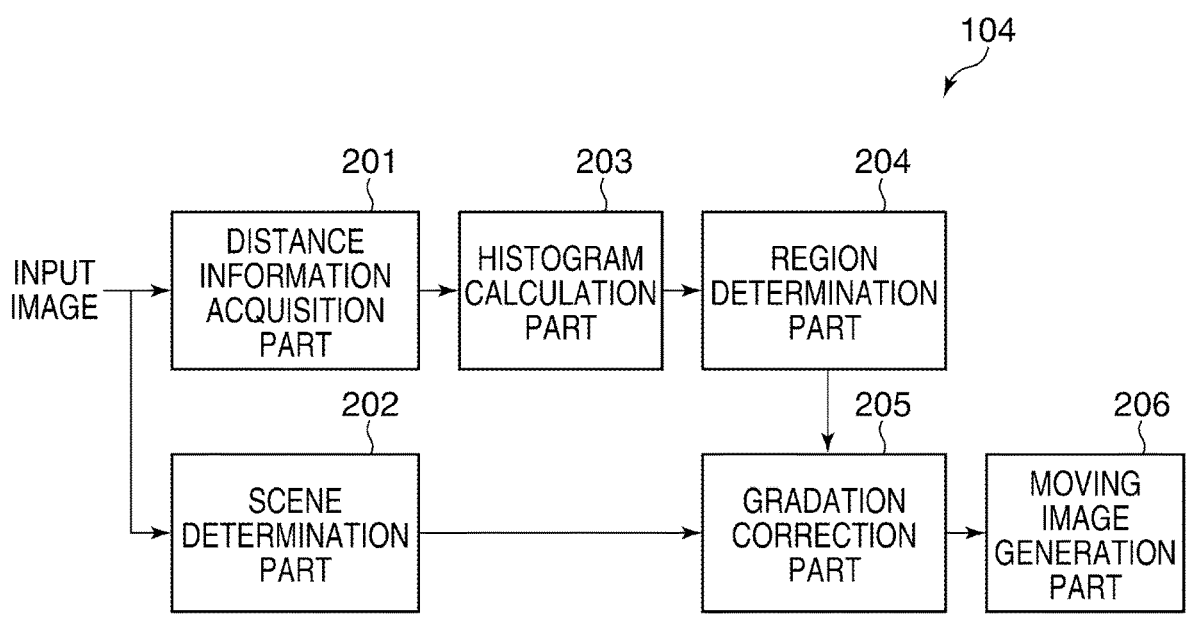
FIG. 2 is a block diagram showing a hardware configuration of an image processing part in FIG. 1.

FIG. 2 is a block diagram showing a hardware configuration of the image processing part 104 in FIG. 1.

A distance information acquisition part 201 generates a distance map showing a distribution of a distance of each subject included in a shot image and a reliability map showing reliability for the distance map, on the basis of a phase difference of a plurality of subject images generated by light beams arriving from different regions of a pupil of the optical system 101. As a specific generation method of the distance map, for example, a known method described in Japanese Laid-Open Patent Publication (kokai) No. 2016-9062 is used, and a defocus amount calculated for each pixel is treated as a subject distance in the distance map. The reliability is a value showing how easily the phase difference (image deviation amount) can be detected in the corresponding region. In the reliability map, there is a high possibility that a subject distance (defocus amount) calculated in a region where it is difficult to detect the image deviation amount is not accurate, so that the reliability is lowered. The region where it is difficult to detect the image deviation amount is a region where there is a poor change in the pattern of the subject like the sky or the vehicle body, for example. Therefore, when the region is detected, low reliability is assigned to the region in the reliability map. In the present embodiment, an edge integral value is used as an index for determining whether or not the pattern change is poor. Specifically, the edge integral value is calculated by dividing an input image into a plurality of minute blocks and integrating absolute values of edge amplitudes of pixels in each minute block. In addition, the calculated edge integral value is compared with a predetermined threshold value and when the calculated edge integral value is smaller than the threshold value, the corresponding region is determined as a region where the pattern change is poor. By performing this determination processing for all the minute blocks of the input image, it is possible to generate the reliability map for the distance map showing the distribution of the subject distance.

A scene determination part 202 determines a shooting scene on the basis of various evaluation values such as a brightness and a hue acquired by the image pickup apparatus 100 at the time of shooting the input image. For a method for acquiring the evaluation values, a known technology may be used. For example, a color temperature of a light source calculated for white balance control as described in Japanese Laid-Open Patent Publication (kokai) No. 2009-44444 may be acquired as the hue to be one of the evaluation values.

A histogram calculation part 203 generates a histogram of the brightness or the color in the entire input image or a partial region thereof.

A region determination part 204 detects a predetermined region from the input image, by referring to the histogram calculated by the histogram calculation part 203.

A gradation correction part 205 performs various correction processing on the region detected by the region determination part 204, by using technology for locally correcting the brightness, the color, the contrast, the chroma, and the like.

A moving image generation part 206 performs various processing such as resizing and encoding on a plurality of images corrected by the gradation correction part 205 and generates a moving image.

Figure 4:
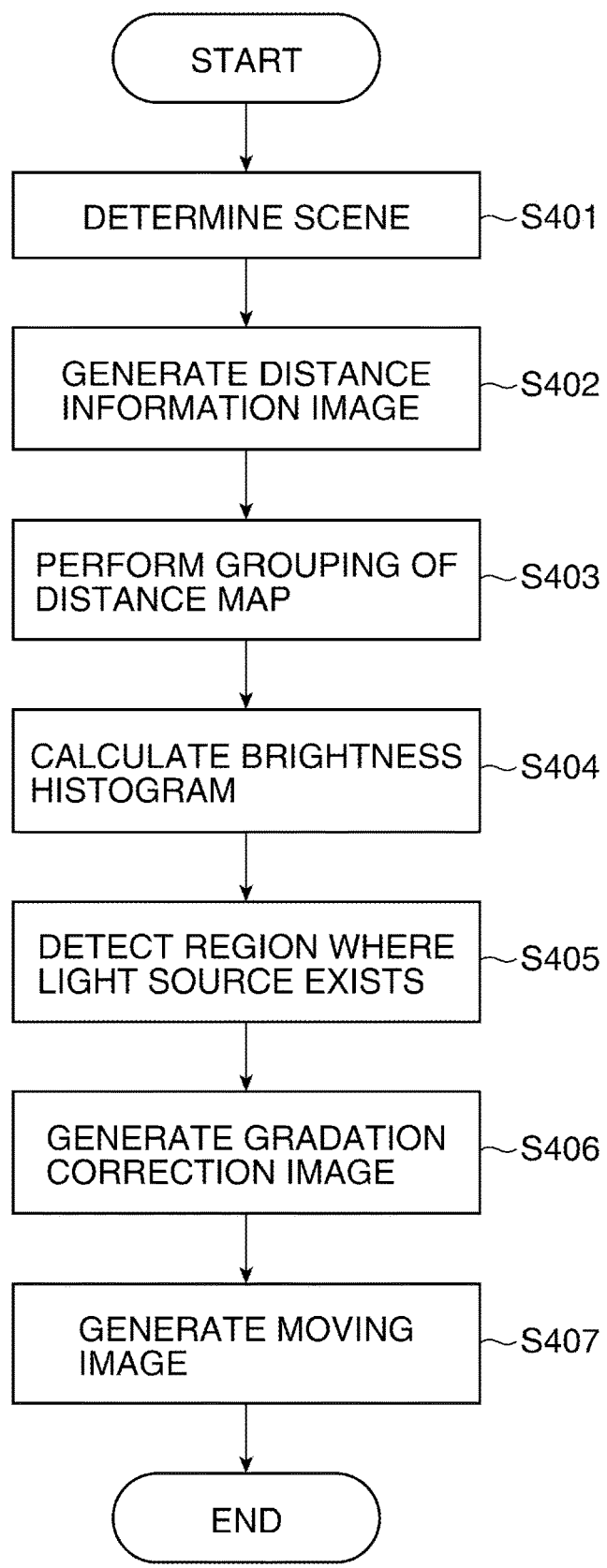
FIG. 4 is a flowchart showing a procedure of moving image generation processing performed on a shooting image in the image pickup apparatus.

FIG. 4 is a flowchart showing a procedure of moving image generation processing performed on a shooting image in the image pickup apparatus 100.

Figure 5C:
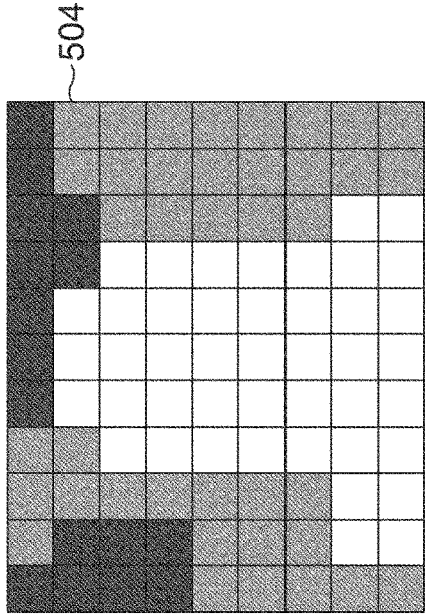
FIGS. 5A to 5D are views showing an example of a shooting image to be a target of the moving image generation processing of FIG. 4 and a distance information image generated according to a distance value thereof.
Figure 5D:
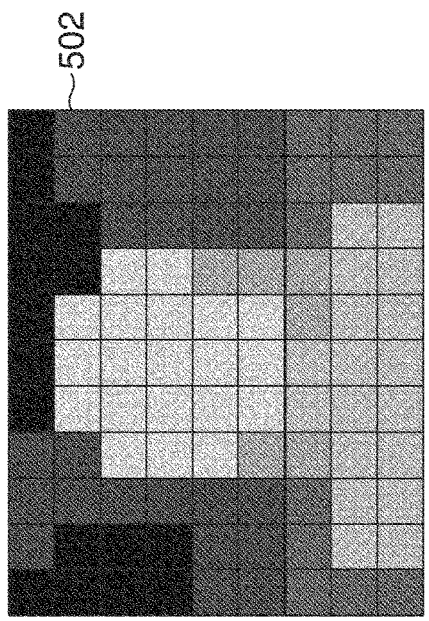
Figure 5A:
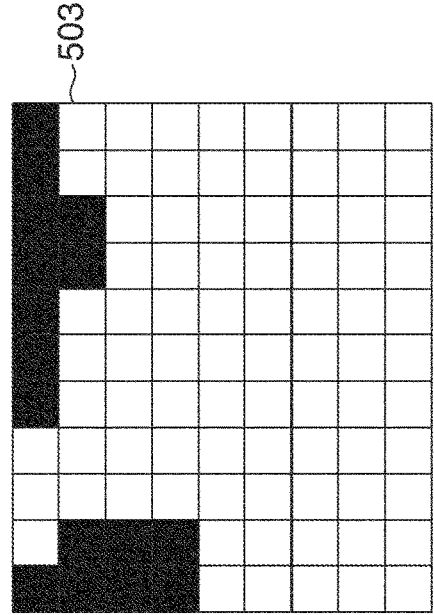

Hereinafter, a description will be made of a case where an image 501 shown in FIG. 5A is used as a shooting image to be a target of the moving image generation processing of FIG. 4. The image 501 is acquired by shooting a night scene including a person by stroboscopic light emission of the image pickup part 102 of the image pickup apparatus 100.

In step S401, a scene and a light source shown by the image 501 are determined by the scene determination part 202. In the present embodiment, the scene is determined as a dark scene and the light source is determined as stroboscopic light. Here, when the scene is determined as a bright scene such as sunny daylight, it is determined that the possibility that a locally changing light source is included is low and the present processing ends without generating a moving image.

Figure 5B:
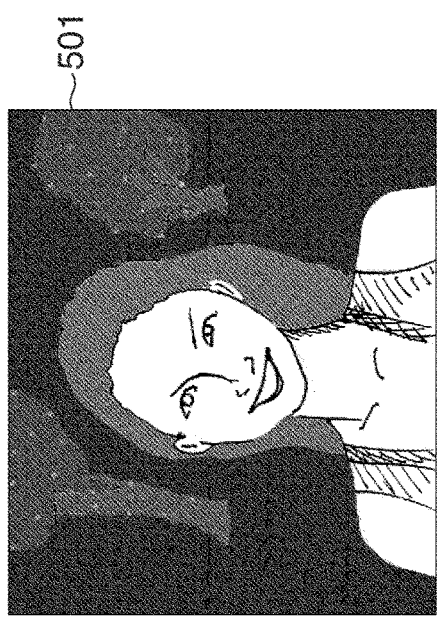

In step S402, the distance information acquisition part 201 generates two types of distance information images including a distance map and a distance reliability map in the image 501. An image 502 shown in FIG. 5B is a distance map generated for the image 501 and shows that a subject distance from the image pickup apparatus 100 at the time of shooting is closer when a pixel value is closer to a white color. In addition, an image 503 shown in FIG. 5C is a reliability map generated for the image 501 and regions such as a person, a ground surface, and trees including an edge are represented by a white color with high reliability and an infinitely distant night sky and a region blurred outside the depth are represented by a black color with low reliability. It should be noted that resolutions of the distance map and the reliability map are not limited thereto and maps with higher resolutions may be generated. Also, the distance map may use a phase difference (image deviation amount) of a plurality of subject images or a value converted into a value of an absolute distance, instead of the defocus amount.

Figure 6:
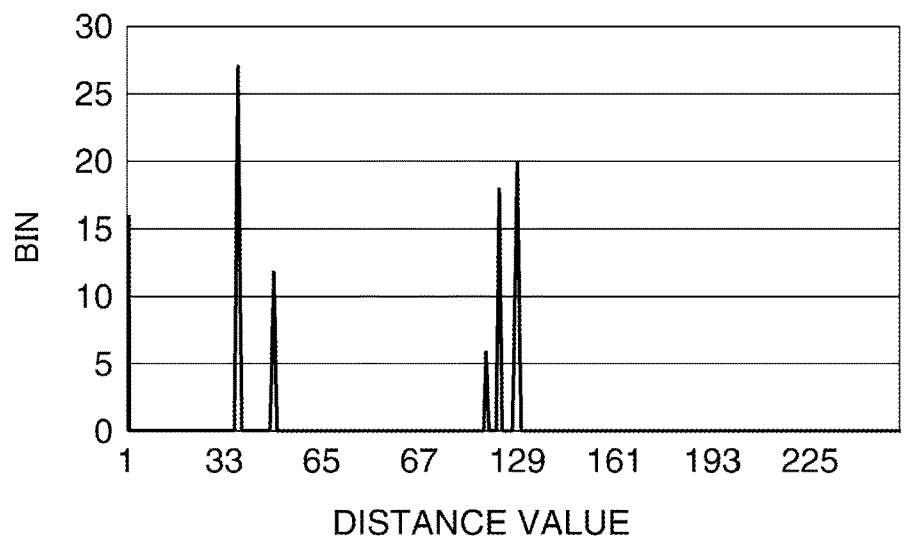
FIG. 6 is a view showing a distance histogram according to the embodiment of the present invention.

In step S403, there is performed processing for grouping the image 502 showing the distance map generated in step S402 with respect to the value of the subject distance using a predetermined threshold value, that is, dividing the distance map into two or more regions (groups). As a method for setting the threshold value, the following method is used in the present embodiment. First, a histogram is generated in only a region with high reliability shown in the image 503 showing the reliability map, out of the region of the image 502 showing the distance map, and a value optimal for dividing the histogram is calculated as the threshold value by a known method. In this respect, as the known method, for example, there is a method for searching, as an optimal value, a threshold value in which, when one group is divided into two groups, a variance in each group is minimized and a variance between groups is maximized. FIG. 6 shows a histogram of the image 502 showing the distance map generated by the above method and it can be seen that a count number with respect to a distance value where the subject exists increases. In the present embodiment, the number of gradations of the image 502 showing the distance map is 8 bits and the distance map is divided into three groups, so that two threshold values 36 and 48 are calculated as a result. An image 504 shown in FIG. 5D shows a distance map in which the image 502 shown in FIG. 5B is grouped into three regions by the calculated threshold value. Referring to the image 504, it can be seen that the image is divided into three regions of a region including a person in which a slight difference of the distance values between a face, a body, and a hair is collected as one group, a region of a foreground background including trees, and a deeper region including infinity.

Figure 7A:
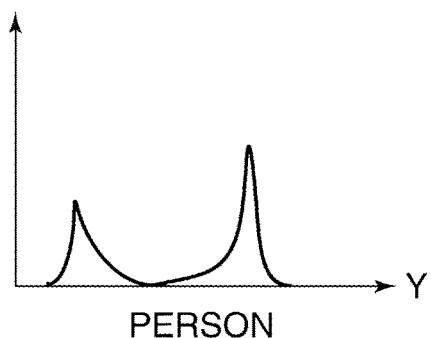
FIGS. 7A to 7C are views showing a brightness histogram generated in each region grouped in an image shown in FIG. 5D.
Figure 7B:
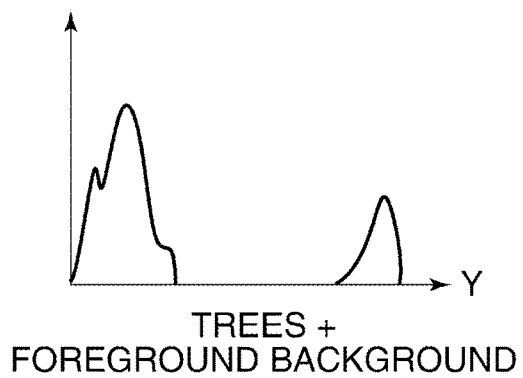
Figure 7C:
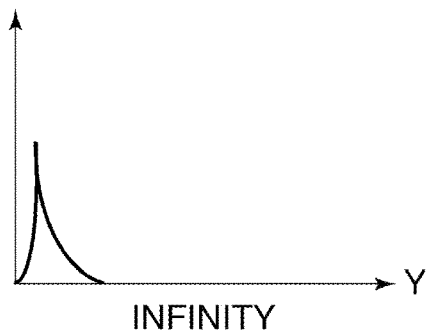

In step S404, a brightness histogram of the image 501 is generated for each grouped region of the image 504 generated in step S403. In the present embodiment, since the number of grouped regions is three, three brightness histograms are generated. Specifically, as shown in FIGS. 7A to 7C, brightness histograms of the individual regions of the person, the background (near side), and the background (back side) grouped in the image 504 shown in FIG. 5D are generated.

In step S405, there is performed processing for detecting a region (high brightness region) where there is a light source, that is, a high brightness subject from the image 501 by using the brightness histogram for each group calculated in step S404. As a detection method, first, the number of pixels having a predetermined brightness value (for example, 224 in 8 bits) or more in the brightness histogram calculated in step S404 for each group is counted. If the counted number is a predetermined number or more, specifically, a predetermined ratio or more, for example, 10% or more of the total number of pixels in the region of the group to be counted, it is determined that the light source exists in the region of the group, and if not, it is determined that the light source does not exist in the region of the group. This is because many high brightness pixels exist in the region of the group where the light source with the high brightness exists. It should be noted that the detection method is not limited thereto and there may be used other methods such as counting not only high brightness pixels but also low brightness pixels by a predetermined value or more. In the image 502, it is determined that a light source such as an illumination exists in the background (near side) shown by the brightness histogram of FIG. 7B, so that it is possible to apply the subsequent gradation correction to only the region of the group. It should be noted that the image 501 may be displayed on the display part 106 in a state in which the region detected in the high brightness region in step S405 can be viewed, for example, in a state in which a frame showing the region is superimposed, and a user may be notified that correction processing for moving image generation is to be performed on the region in the frame. By this notification, the user can confirm whether or not a desired region changes, when the image 501 is converted into a moving image.

Figure 8A:
FIGS. 8A to 8C are views showing each image generated in step S406 of FIG. 4.
Figure 8B:
Figure 8C:
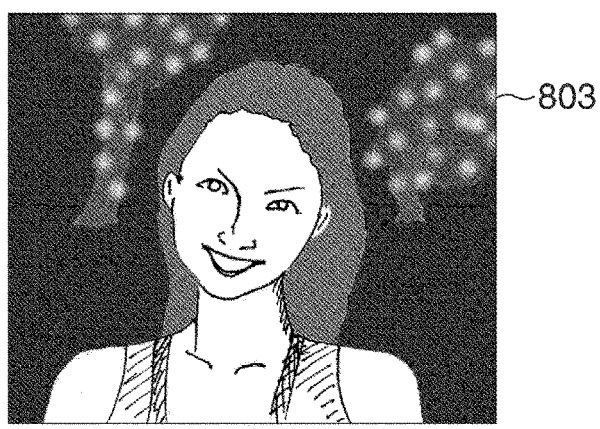

In step S406, the gradation correction part 205 performs the gradation correction on a region where distance reliability of the region of the group determined as having the light source in step S405 is high in the input image 501 and generates a plurality of images. In the present embodiment, an image in which the correction intensity has been changed in three stages is generated, in processing for locally correcting the contrast with respect to the high brightness pixels and surrounding pixels thereof. Specifically, the correction intensity of the contrast is controlled by changing an inclination of a monotonous change, in a brightness versus gain characteristic of the gradation correction for the high brightness pixels and several pixels adjacent thereto. The purpose of this is to change a propagation state of the light by changing the local contrast. Images 801 to 803 of FIGS. 8A to 8C are images generated in step S406 and it can be seen that the propagation state of the light of the light source on the background (near side) determined in step S405 is different in each image. This is because a value of the inclination of the monotonous change of the brightness versus gain characteristic is controlled to become a different value between the images generated in step S406. In the present embodiment, the value of the inclination in the image 801 from among the images 801 to 803 of FIGS. 8A to 8C is controlled to become largest and the value of the inclination of the image 803 is controlled to become smallest. In correction of each image, the correction intensity of the contrast, that is, the inclination of the gain characteristic is relatively smaller as compared with than the pixel of which distance is closer, when a distance from a pixel (light source) having a predetermined brightness value or more is longer. As a result, a degree of influence of light received from the light source can be changed according to the distance.

In the present embodiment, although only the contrast is corrected, the present invention is not limited thereto and the brightness, the color, the chroma, or the like may be corrected. For example, in the case of the night scene as in the present embodiment, the light source may be regarded as an illumination to be an artificial lighting and a color may be randomly changed. By performing this correction, it is possible to give a change with an atmosphere of a night view more.

In step S407, a moving image is generated by the moving image generation part 206 using the plurality of images generated in step S406 and the generated moving image is recorded in the recording part 107, followed by the present processing being terminated. In the case of the present embodiment, the image 501 before the gradation correction and the images 801 to 803 after the gradation correction are arranged in order and a moving image is generated by repeating this until the number of seconds of the moving image becomes the desired number of seconds of the moving image. That is, the moving image including frame images arranged in the order of the images 501→801→802→803→802→801→501→ . . . is generated. It should be noted that the arrangement order of the frames is not limited thereto and may be random. A frame rate of the moving image is assumed to be about 5 fps in consideration of an interval at which the light of the illumination to be the artificial lighting changes. A format of the moving image to be generated is not particularly limited and animations based on AVI, MPG, Motion MEG, or gif are generated.

According to the present embodiment, after acquiring the input image, acquisition of the distance information and region determination are performed by the image processing part 104, the gradation correction is performed, and the moving image is generated. At this time, a plurality of images in which the intensity of the gradation correction has been changed in only the region where the light source exists are generated, so that it is possible to generate the moving image having an effect suitable for a scene from one shot image.

Figure 9:
FIG. 9 is a view showing another example of a shooting image to be a target of the moving image generation processing of FIG. 4.

In the present embodiment, the moving image in which the illumination is turned on in the outdoor night scene has been described. However, the present invention is applicable to other scenes and light sources. For example, when the shooting image to be the target of the moving image generation processing of FIG. 4 may be shot under a warm color system light source with a low color temperature (hue) like a candle in a dark scene, as in an image 901 of FIG. 9. In this case, in step S406, only the contrast and brightness are corrected with an irregular difference in correction intensity between frames without changing the color and in step S407, by randomizing the arrangement order of frames and the frame rate, irregular movement can be represented.

In the present embodiment, a configuration for generating the distance information on the basis of a phase difference between a plurality of subject images in which the light beams arriving from the different regions of the pupil of the optical system 101 are generated as shown in FIGS. 3A and 3B has been described as a unit for acquiring the distance information. However, other configurations and units may be substituted or used together. For example, in order to acquire at least two or more multi-viewpoint image groups having different viewpoints, by configuring the image pickup apparatus 100 as a compound eye camera having a plurality of lenses and image pickup devices, a more accurate image deviation amount may be detected. Further, by configuring the image pickup apparatus 100 as a TOF (Time Of Flight) camera, distance measurement performance for a subject with a poor pattern change can be improved.

Figure 10:
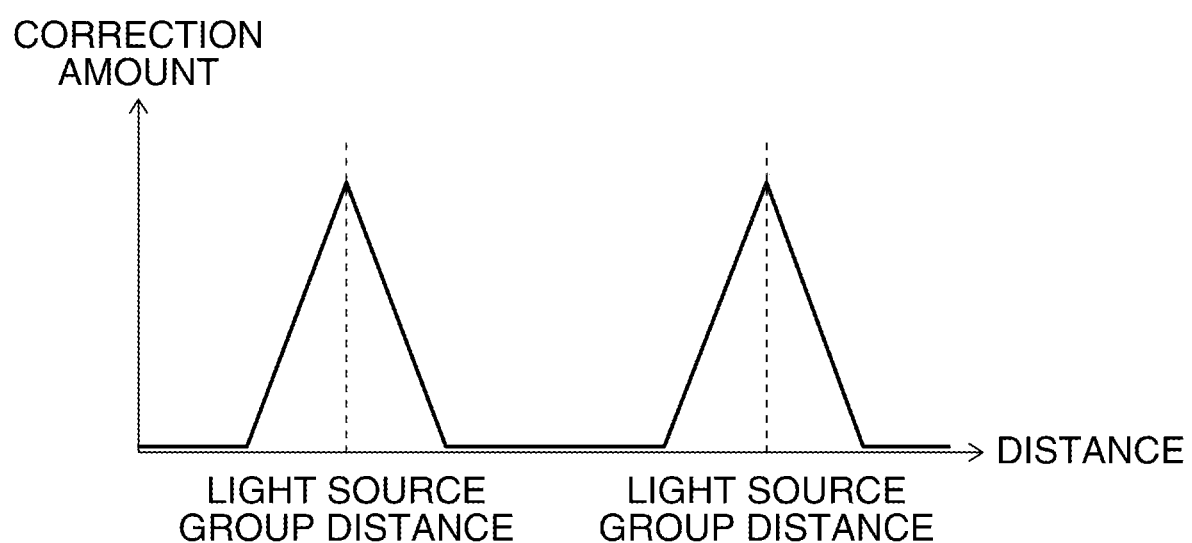
FIG. 10 is a view which is useful in explaining an example of a method for determining a correction amount used for gradation correction in step S406 of FIG. 4.

Further, in the present embodiment, there has been described the gradation correction in the case where there is only one region of the group including the light source in step S406. However, there may be a plurality of regions of the groups including the light source. In this case, the correction intensity may be changed according to the distance from the light source. For example, an average value of the subject distances is calculated for the region of each divided group in step S404, and the correction amount is determined according to the average value of the subject distances as shown in FIG. 10. In the present embodiment, the maximum correction amount is applied when the subject distance of each of the regions (in this case, two regions) of the group including the light source is the average value, and the correction amount is decreased as the difference from the average value of the subject distances is increased. As a result, it is possible to moderate switching of the local effect in the image.

In the present embodiment, a moving image is generated in only a specific scene. However, the user may select generation or non-generation of the moving image and a method therefor, according to personal preference. For example, in order to change the reflection of sunlight on a water surface or a snow surface even in the scene of sunny daylight, an image in which the brightness has been corrected may be generated in step S406. Further, as shown in FIG. 3B, since a pair of photoelectric conversion units 303A and 303B is provided in each of the pixels 302 constituting the image pickup part 102, two images having a parallax (multi-viewpoint image group) are obtained from the image pickup part 102. Therefore, it is possible to represent sparkling of reflected light by composing images obtained by alternately selecting or weighting and adding the two images to generate a moving image.

Although the preferred embodiments of the present invention have been described above, the present invention is not limited to these embodiments and various variations and changes can be made within the scope of the gist thereof.

For example, a part or all of each image processing described in the embodiments may be executed by an external apparatus (computer or the like) of the apparatus (camera or the like) used for shooting the image.

Other Embodiments

Although the embodiments have been described in detail above, the present invention can take embodiments as a system, an apparatus, a method, a program, or a storage medium (recording medium), for example. More specifically, the present invention may be applied to a system including a plurality of devices, or may be applied to an apparatus including a single device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In this case, the present invention may take the form of an object code, a program executed by an interpreter, script data supplied to an OS, or the like as long as it has a function of a program.

Besides, as a method for supplying a program, the program can also be supplied by downloading the program from a website on the Internet to a recording medium such as a hard disk by using a browser of a client computer. That is, the computer program of the present invention or a compressed file including an automatic installation function is downloaded from the website by accessing the website. Further, it can be realized by dividing program codes constituting the program of the present invention into a plurality of files and downloading the respective files from different websites. In other words, a WWW server that causes a plurality of users to download a program file for realizing the functional processing of the present invention by a computer is also included in the present invention.

Further, the program of the present invention is encrypted, stored in a storage medium such as CD-ROM, and distributed to users. A user who has satisfied a predetermined condition is caused to download key information for decryption from the website via the Internet. In addition, it can be realized by installing the encrypted program on a computer by executing the encrypted program by using the key information.

The functions of the embodiments described above are realized even after the program read from the recording medium is written in a memory provided in a function expansion board inserted into the computer or a function expansion unit connected to the computer. That is, the functions of the embodiments are realized by performing a part or all of the actual processing by a CPU provided in the function expansion board or the function expansion unit, according to an instruction of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-233592, filed Dec. 5, 2017 which is hereby incorporated by reference wherein in its entirety.

What is claimed is:

1. An image processing apparatus, comprising:
an acquisition unit configured to acquire a first image generated by shooting;
a division unit configured to divide the first image into two or more regions according to a distribution of a distance of each subject, at the time of shooting, included in the first image;
a detection unit configured to detect one of the divided regions as a high brightness region where high brightness pixels exist;
a first generation unit configured to perform correction of the first image with different correction intensities with respect to the high brightness pixels and surrounding pixels thereof in the high brightness region to generate a plurality of second images; and
a second generation unit configured to generate a moving image using the generated second images.

2. The image processing apparatus according to claim 1, wherein the first generation unit corrects at least one of a contrast, a brightness, a color, and a chroma of the first image as the correction.

3. The image processing apparatus according to claim 1, wherein the detection unit detects, as the high brightness region, a region where a ratio of the number of high brightness pixels to the total number of pixels of one of the divided regions is a predetermined ratio or more.

4. The image processing apparatus according to claim 3, wherein the first generation unit decreases the correction intensity when a distance from the high brightness pixel increases.

5. The image processing apparatus according to claim 4, wherein the first generation unit monotonously changes the correction intensity according to the distance from the high brightness pixel.

6. The image processing apparatus according to claim 5, wherein a value of an inclination of the monotonous change is controlled to a different value between the second images.

7. The image processing apparatus according to claim 1, further comprising a determination unit configured to determine a shooting scene in the first image,
wherein setting of which of a contrast, a brightness, a color, and a chroma of the first image is corrected and setting of the correction intensity for each of the second images are performed according to the determined shooting scene.

8. The image processing apparatus according to claim 7, wherein the shooting scene is determined on the basis of at least one of information of a brightness and a hue.

9. The image processing apparatus according to claim 1, wherein the acquisition unit acquires at least two or more multi-viewpoint image groups having different viewpoints as the first image, and the second generation unit selects or combines the multi-viewpoint image groups on which the correction has been performed by the first generation unit to generate the moving image.

10. The image processing apparatus according to claim 1, wherein the high brightness pixels are pixels having a predetermined brightness value or more.

11. The image processing apparatus according to claim 1, wherein the first image is displayed in a state in which the detected region is visually recognized and information showing that the correction by the first generation unit is performed on the detected region is transmitted.

12. An image pickup apparatus, comprising:
an image processing apparatus, including
an acquisition unit configured to acquire a first image generated by shooting,
a division unit configured to divide the first image into two or more regions according to a distribution of a distance of each subject at the time of shooting, included in the first image,
a detection unit configured to detect one of the divided regions as a high brightness region where high brightness pixels exist,
a first generation unit configured to perform correction of the first image with different correction intensities with respect to the high brightness pixels and surrounding pixels thereof in the high brightness region to generate a plurality of second images, and
a second generation unit configured to generate a moving image using the generated second images; and
an image pickup unit configured to generate the first image.

13. An image processing method executed by an image processing apparatus, the method comprising:
- an acquisition step of acquiring a first image generated by shooting;
- a division step of dividing the first image into two or more regions according to a distribution of a distance of each subject, at the time of shooting, included in the first image;
- a detection step of detecting one of the divided regions as a high brightness region where high brightness pixels exist;
- a first generation step of performing correction of the first image with different correction intensities with respect to the high brightness pixels and surrounding pixels thereof in the high brightness region to generate a plurality of second images; and
- a second generation step of generating a moving image using the generated second images.

14. A computer-readable non-transitory storage medium storing a program for causing a computer to perform an image processing method, the image processing method comprising:
- an acquisition step of acquiring a first image generated by shooting;
- a division step of dividing the first image into two or more regions according to a distribution of a distance of each subject, at the time of shooting, included in the first image;
- a detection step of detecting one of the divided regions as a high brightness region where high brightness pixels exist;
- a first generation step of performing correction of the first image with different correction intensities with respect to the high brightness pixels and surrounding pixels thereof in the high brightness region to generate a plurality of second images; and
- a second generation step of generating a moving image using the generated second images.

* * * * *